United States Patent
Smart et al.

(10) Patent No.: US 8,160,011 B2
(45) Date of Patent: Apr. 17, 2012

(54) FEMTOCELL DEVICE

(75) Inventors: Christopher Brian Smart, Wiltshire (GB); Fiona Clare Angharad Somerville, Bristol (GB)

(73) Assignee: Picochip Limited, Bath (GB)

( * ) Notice: Subject to any disclaimer, the term of this patent is extended or adjusted under 35 U.S.C. 154(b) by 613 days.

(21) Appl. No.: 12/355,002

(22) Filed: Jan. 16, 2009

(65) Prior Publication Data

US 2009/0187690 A1    Jul. 23, 2009

(30) Foreign Application Priority Data

Jan. 18, 2008  (GB) .................................. 0801019.1

(51) Int. Cl.
*H04B 14/08* (2006.01)
(52) U.S. Cl. ....................................... 370/329; 370/338
(58) Field of Classification Search .................. 370/328, 370/329, 338, 349, 395.4, 431, 471; 455/446
See application file for complete search history.

(56) References Cited

U.S. PATENT DOCUMENTS

| | | | |
|---|---|---|---|
| 2005/0124344 A1* | 6/2005 | Laroia et al. | 455/436 |
| 2005/0250502 A1* | 11/2005 | Laroia et al. | 455/447 |
| 2006/0089154 A1* | 4/2006 | Laroia et al. | 455/456.2 |
| 2007/0183427 A1 | 8/2007 | Nylander et al. | |
| 2009/0168907 A1* | 7/2009 | Mohanty et al. | 375/260 |

FOREIGN PATENT DOCUMENTS

| | | |
|---|---|---|
| EP | 1418776 A1 | 5/2004 |
| WO | 2007/021139 A1 | 2/2007 |

OTHER PUBLICATIONS

European Extended Search Report for Application No. 09150654.3-2412/2081408, dated Mar. 23, 2011.
Holger Claussen, Bell Laboratories, Alcatel-Lucent; "Performance of Macro and Co-Channel Femtocells in a Hierarchical Cell Structure"; The 18th Annual IEEE International Symposium on Personal, Indoor and Mobile Radio Communications (PIMRC'07); Sep. 1, 2007; pp. 1-5, XP031168593, ISBN: 978-1-4244-1143-6; Swindon, United Kingdom.
UK Search Report for Application No. GB0801019.1, dated Apr. 28, 2008.

* cited by examiner

*Primary Examiner* — Brian Nguyen
(74) *Attorney, Agent, or Firm* — Alston & Bird LLP (57) ABSTRACT

There is provided a femtocell device for communicating with one or more user devices in a communication network, the network having a plurality of subchannels available for transmissions, wherein the femtocell device is adapted to use a first subset of the plurality of subchannels for communicating with user devices that are in a closed subscriber group of the femtocell device and within a first area, and a second subset of the plurality of subchannels for communicating with other user devices.

21 Claims, 6 Drawing Sheets

| Subchan | Group | 2-segment mappings |||||||||
|---|---|---|---|---|---|---|---|---|---|
| 0 | 0 | | | | | | | | |
| 1 | | | | | | | | | |
| 2 | | | | | | | | | |
| 3 | | | | | | | | | |
| 4 | | | | | | | | | |
| 5 | | | | | | | | | |
| 6 | 1 | | | | | | | | |
| 7 | | | | | | | | | |
| 8 | | | | | | | | | |
| 9 | | | | | | | | | |
| 10 | 2 | | | | | | | | |
| 11 | | | | | | | | | |
| 12 | | | | | | | | | |
| 13 | | | | | | | | | |
| 14 | | | | | | | | | |
| 15 | | | | | | | | | |
| 16 | 3 | | | | | | | | |
| 17 | | | | | | | | | |
| 18 | | | | | | | | | |
| 19 | | | | | | | | | |
| 20 | 4 | | | | | | | | |
| 21 | | | | | | | | | |
| 22 | | | | | | | | | |
| 23 | | | | | | | | | |
| 24 | | | | | | | | | |
| 25 | | | | | | | | | |
| 26 | 5 | | | | | | | | |
| 27 | | | | | | | | | |
| 28 | | | | | | | | | |
| 29 | | | | | | | | | |

| Number of Subchannels per Segment ||||||||| 
|---|---|---|---|---|---|---|---|---|
| 1st Segment | 6 | 10 | 12 | 14 | 16 | 18 | 20 | 24 |
| 2nd Segment | 24 | 20 | 18 | 16 | 14 | 12 | 10 | 6 |

1st segment

2nd segment

FEMTOCELL DEVICE

This application claims the benefit of priority from British Patent Application No. 0801019.1 filed in the United Kingdom on Jan. 18, 2008. The subject matter of this application is incorporated herein by reference.

TECHNICAL FIELD OF THE INVENTION

The invention relates to a femtocell device in a wireless communication network, and in particular to a femtocell device that provides open and closed access to user devices.

BACKGROUND OF THE INVENTION

Femtocells are small, low-power, indoor cellular base stations designed for residential deployment. They provide better network coverage and capacity than that available in such environments from the overlying macrocellular network. In addition, femtocells use a broadband connection to receive data from and send data back to the operator's network (known as "backhaul").

Conventionally, femtocell devices are configured to treat users in one of two ways. In the first configuration, the femtocell device acts as an extension to the existing macrocellular network and provides enhanced network coverage and capacity for all users in range of the femtocell device. In a residential context, this means that the femtocell device will provide access to the network for those resident in that location, as well as for neighbours and passers-by if the macrocellular coverage is poor. In this configuration, all users are considered to be part of an open subscriber group, and the use of the femtocell device is not restricted to any particular set of users. Any interference between transmissions from the femtocell device and the overlying macrocellular network will be mitigated by the ability for users to handoff between the femtocell device and the macrocellular network. However, in this configuration, the femtocell device will use the (otherwise private) broadband connection of the femtocell device owner to provide backhaul for public access to the network, and it is not easy to provide users with a reliable quality of service (QOS).

In the second configuration, the femtocell device restricts access to the network to a defined set of subscribers (a closed subscriber group), which results in a better quality of service (QOS) and higher data bandwidth for the subscribers in the closed group. This defined set of subscribers will usually be agreed between the femtocell owner and the network operator (for example those usually resident at the address where the femtocell device is located). However, in this configuration, transmissions from the femtocell device to users in the closed subscriber group can interfere with transmissions from the overlying macrocellular network to other users (not in the closed subscriber group) in the vicinity of the femtocell device. For example, if the femtocell device is using the same channel as the surrounding macrocellular network cell, there could be interference between the two.

SUMMARY OF THE INVENTION

According to the invention, there is provided a femtocell device that can provide simultaneous access to both open subscriber groups and closed subscriber groups. In this way, the femtocell device according to the invention allows the advantages of both configurations to be realised.

In particular, there is provided a femtocell device for communicating with one or more user devices in a communication network, the network having a plurality of subchannels available for transmissions, wherein the femtocell device is adapted to use a first subset of the plurality of subchannels for communicating with user devices that are in a closed subscriber group of the femtocell device and within a first area, and a second subset of the plurality of subchannels for communicating with other user devices.

In accordance with a further aspect of the invention, there is provided a method of communicating with one or more user devices in a communication network, the network having a plurality of subchannels available for transmissions, the method comprising using a first subset of the plurality of subchannels for communicating with user devices that are in a closed subscriber group associated with a femtocell device and within a first area around the femtocell device; and using a second subset of the plurality of subchannels for communicating with other user devices.

BRIEF DESCRIPTION OF THE DRAWINGS

The invention will now be described, by way of example only, with reference to the following drawings, in which.

DETAILED DESCRIPTION OF THE PREFERRED EMBODIMENTS

Although the invention will be described with reference to a femtocell device for a WiMAX communications network, it will be appreciated that the invention is applicable to any type of second, third or subsequent generation cellular communication network in which it is possible to provide open and closed access to a femtocell, and in which it is possible to provide this multiple access capability through allocation of distinct or orthogonal resources. In particular, the invention is also applicable to devices for a network in accordance with the IEEE 802.16m standard or a 3GPP Long Term Evolution (LTE) network. In other types of network, femtocell devices are known as home base stations, access point base stations or 3G access points.

Figure 1:
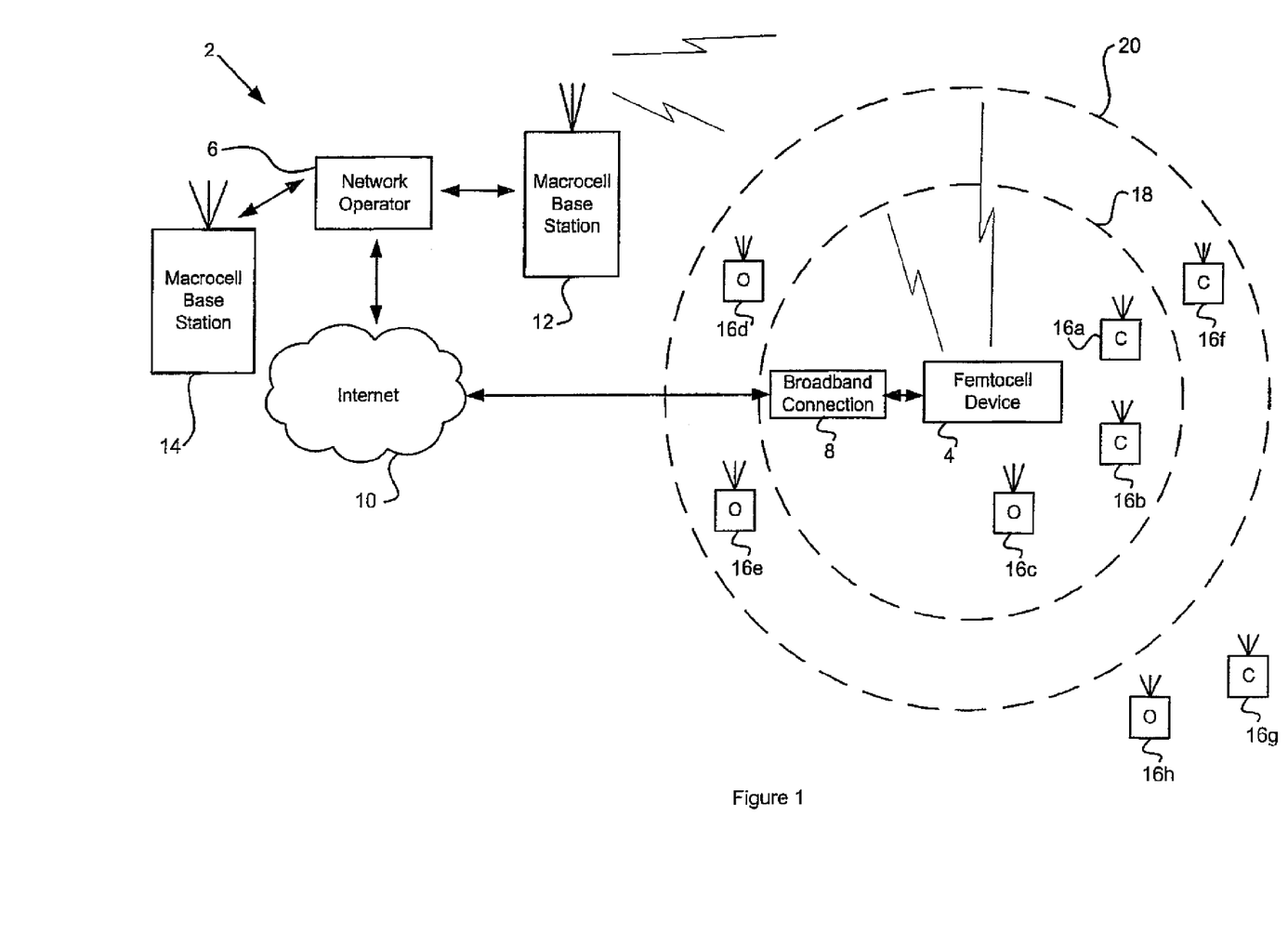
FIG. 1 shows a communication network including a femtocell device in accordance with the invention.

FIG. 1 shows a communication network 2 that includes a femtocell device 4 in accordance with the invention. The femtocell device 4 is connected to a network operator 6 via a broadband connection 8 and the Internet 10. As described above, this broadband connection 8 is used for backhaul, i.e. for any data that needs to be sent from the femtocell device 4 to or via the network operator 6, and any data that needs to be sent to the femtocell device 4 from the network operator 6.

The network operator 6 is also connected to a conventional macrocellular network, which comprises one or more macrocell base stations 12, 14. In this illustrated example, the macrocell base station 12 maintains a macrocell that covers the area or building in which the femtocell device 4 is located. Although the invention will be described with reference to an overlying macrocell, it will be appreciated that the invention can operate with any other type of network-managed base station, including those controlling a microcell or picocell.

In addition, a number of user devices 16 are in the region of the femtocell device 4 (although not necessarily in communication range), and are within the macrocell maintained by base station 12.

Each of the user devices 16 is categorised as either an open device (indicated with an 'O') or a device that is listed as being in the closed subscriber group of the femtocell device (indicated with a 'C'). Thus, user devices 16c, 16d, 16e and 16h are open devices, and user devices 16a, 16b, 16f and 16g are listed in the closed subscriber group. In this specification, the terms "open device", or user devices in an "open subscriber group" or "open access group" refer to user devices 16 that are not listed in the closed subscriber group of the femtocell device 4.

As described above, conventional femtocell devices can either operate in a closed subscriber group mode in which only user devices in a defined list can communicate with the femtocell device, or an open subscriber mode in which any user device can communicate with the femtocell device.

In accordance with the invention, the femtocell device 4 can communicate simultaneously with user devices 16 in both types of subscriber group.

In particular, the femtocell device 4 in accordance with the invention effectively maintains two concentric areas of coverage, one area for user devices 16 listed in the closed subscriber group (referred to as an "inner" or "first" area below), and the other area for all user devices 16 (referred to as an "outer" or "second" area below). In FIG. 1, these concentric areas are shown by dashed circle 18 for the closed subscriber group and dashed circle 20 for devices not in the closed subscriber group, or devices in the closed subscriber group that are outside of the first area 18. Of course, it will be appreciated that the particular shape and extent of the areas will be determined by the propagation conditions in the vicinity of the femtocell device 4. The area 20 represents the extent of the transmissions from the femtocell device 4, and is otherwise referred to herein as the "femtocell".

In a WiMAX communications network, the air interface is divided into a number of subchannels, with each user device 16 transmitting or receiving data on a respective one or more of the subchannels. Therefore, in a preferred embodiment of the invention, the femtocell device 4 maintains the two concentric areas of coverage by reserving a first subset of the plurality of subchannels for devices 16 listed in the closed subscriber group, and using a second subset of the plurality of subchannels for devices 16 not listed in the closed subscriber group.

In a preferred embodiment of the invention, the first subset of the plurality of subchannels comprises more subchannels than the second subset. Thus, in this embodiment, more bandwidth is provided to the devices 16 in the closed subscriber group than open devices 16. However, depending on the circumstances (for example the type of building in which the femtocell device 4 is located), or the agreement between the femtocell owner and the network operator, the subsets of subchannels may be the same size, or the first subset may comprise less subchannels than the second subset.

In a further embodiment of the invention, the femtocell device 4 is adapted to transmit signals on subchannels in the first subset at a lower power level than signals on subchannels in the second subset. In this way, with appropriate power levels for the first and second subsets, the signals on subchannels in the first subset can be constrained largely to the inside of the building in which the femtocell device 4 is located, while signals on subchannels in the second subset can propagate a certain distance outside the building. This is shown in FIG. 1, with the coverage area 18 for devices 16 in the closed subscriber group having a smaller radius than the coverage area 20 for the open devices 16.

Thus, in the illustrated embodiment of FIG. 1, due to the different sized coverage areas 18, 20, only user devices 16g and 16h are unable to communicate with the femtocell device 4, since they are outside of the femtocell 20. It will be appreciated that user device 16f (which is listed in the closed subscriber group) can only communicate with the femtocell device 4 on one of the subchannels in the second subset as it is outside of area 18, and it will be subject to the same constraints on bandwidth as other devices 16 that are not in the closed subscriber group. It will also be appreciated that although user device 16c is within area 18, it can only communicate with the femtocell device 4 using a subchannel in the second subset, as it is a device that is not in the closed subscriber group.

Thus, the invention allows the benefits of both open and closed access to femtocell devices to be realised, while minimising their disadvantages. In the preferred embodiment, the majority of the data bandwidth is made available to the user devices in the closed subscriber group, while still allowing neighbours and passers-by to access the network. The use of the private broadband connection 8 by public (i.e. non-closed subscriber group) devices will be minimised, and, in a preferred embodiment, a MAC scheduler can ensure that data traffic for closed subscriber group devices 16 is prioritised over open group user devices 16.

Interference to transmissions in the macrocell caused by devices in the closed subscriber group will also be minimised, since the transmissions by devices in the closed subscriber group will be substantially restricted to inside the building (i.e. within area 18), provided a suitable transmission power level is chosen. Furthermore, the femtocell device 4 allows the extent of the macrocell to be extended to otherwise poor-reception areas.

Figure 2:
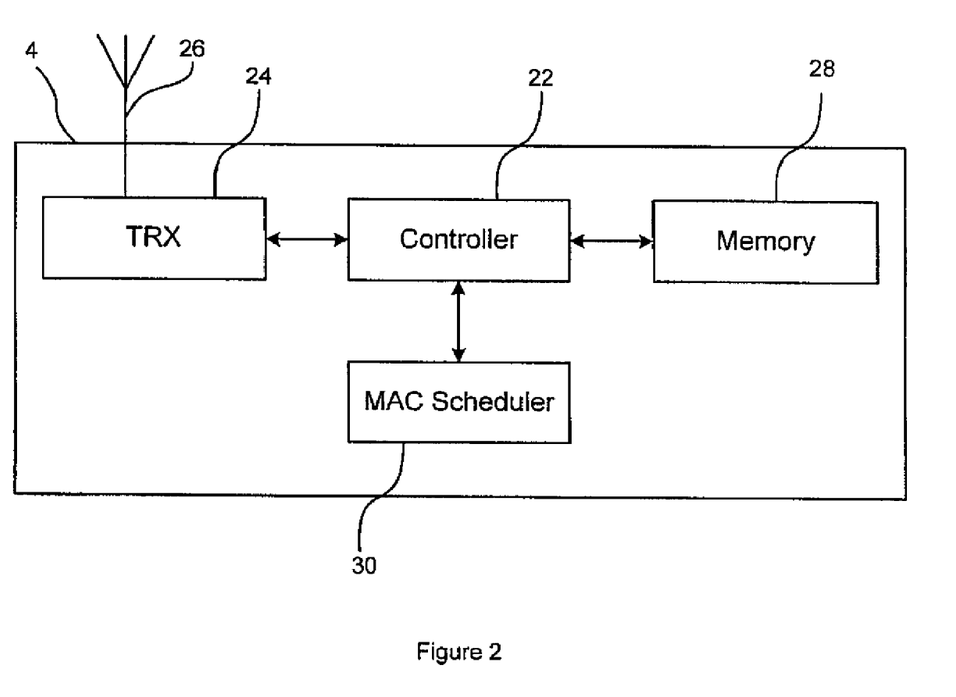
FIG. 2 is a block diagram of a femtocell device in accordance with the invention.

FIG. 2 is a block diagram of an exemplary femtocell device 4 in accordance with the invention. The femtocell device 4 comprises a controller 22 that controls the operation of the femtocell device 4. The controller 22 is connected to transceiver circuitry 24 and an antenna 26 for sending and receiving signals over the air interface on one or more of the subchannels. The femtocell device 4 also includes a memory 28 for storing data or information relevant to the operation of the femtocell device 4. In some embodiments, the memory 4 can store information identifying those user devices 16 that are in the closed subscriber group. In preferred embodiments, this information can comprise a MAC address for each user device 16. In alternative embodiments, the network operator 6 can retain the information identifying the user devices 16 in the closed subscriber group, and can pass this information to the femtocell device 4 when a user device 16 initially registers with the femtocell.

The femtocell device 4 further includes a Medium Access Control (MAC) Scheduler 30 that is responsible for the scheduling of transmissions and the allocation of subchannels to user devices 16, and it is this scheduler that enforces the open and closed access restrictions.

In WiMAX networks, the structure of the downlink changes on a frame-by-frame basis. The responsibility to specify the format of every downlink frame lies with the MAC scheduler 30. For every frame, the MAC scheduler 30 decides what data will be sent, how the data will be encoded, and where in the frame the data will be placed. The MAC scheduler 30 is typically designed to ensure efficient use of the air interface while meeting quality of service requirements.

Further specific embodiments of the invention will now be described with reference to FIGS. 3 to 6 below.

According to the WiMAX standard, it is possible for subsets of the available subchannels to be mapped to different "segments" within the femtocell device 4 or other base station. In particular, the femtocell device 4 can allocate one or more subsets of subchannels to one of three segments, with each segment mapped to one antenna sector, thereby providing directional functionality to the femtocell device 4 or base station.

However, in accordance with an embodiment of the invention, this "segmentation" is used to create the concentric coverage areas around a single omnidirectional antenna 26 in the femtocell device 4.

In this embodiment, two "segments" are created, each preferably transmitted at a different power level, such that devices 16 in the closed subscriber group use the low power segment and all other devices 16 use the high power segment (that has a larger area). Furthermore, as described above, the two segments will preferably be allocated different numbers of subchannels, such that the segment for the closed subscriber group has a higher bandwidth capacity than the segment for open devices.

Figure 3:
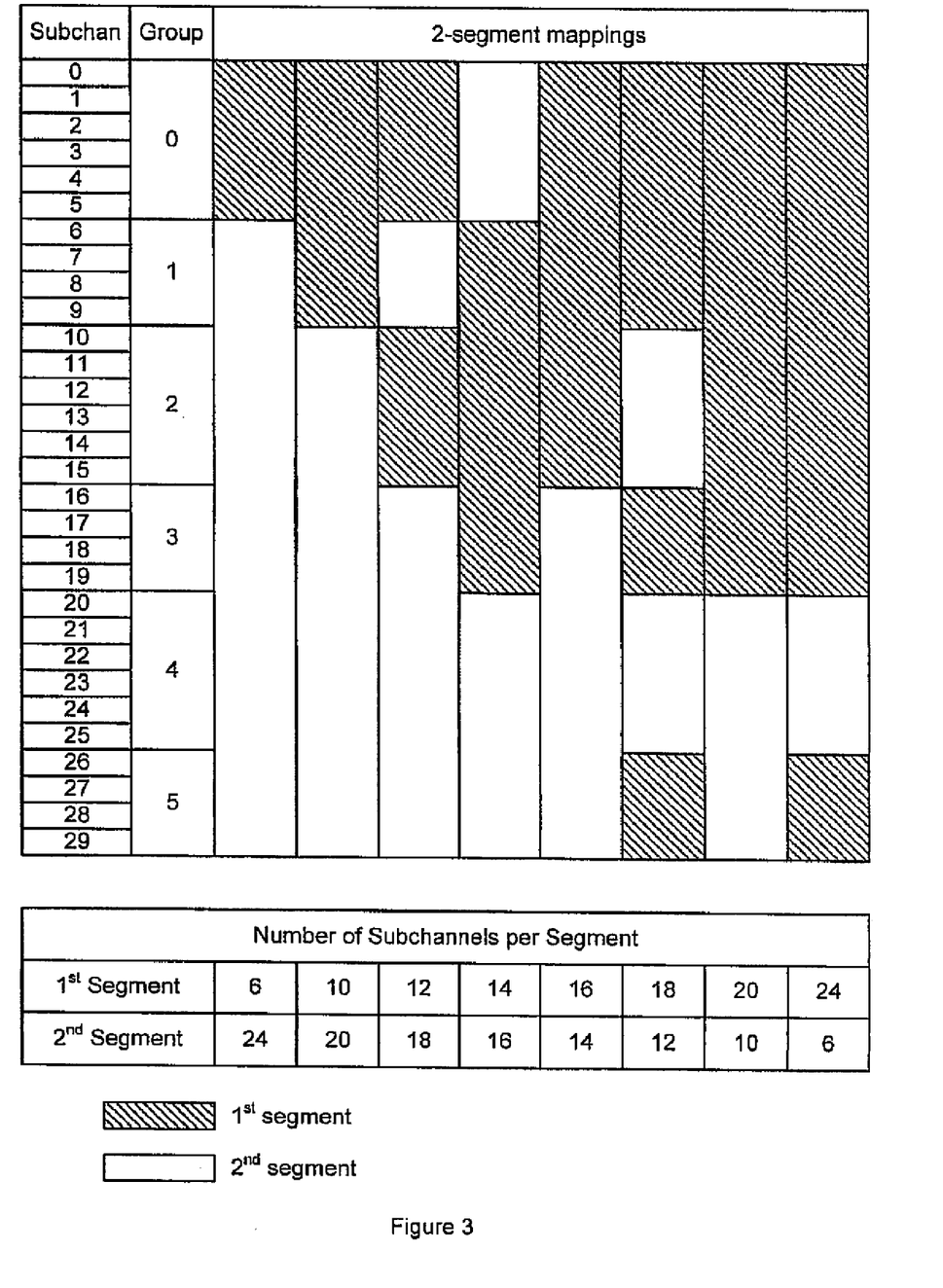
FIG. 3 is a table showing an exemplary mapping of subchannels to two segments.

FIG. 3 shows an exemplary mapping of subchannels to two segments in which there are 30 subchannels available. The 30 subchannels are split into six groups, the even numbered groups having six subchannels and the odd numbered groups having four subchannels. It is not possible for subchannels to be arbitrarily assigned to segments; rather the partitioning must be in the granularity of the subchannel groups, and furthermore, there must be at least one even numbered group in each segment (for example, it is not possible to map 25 subchannels to one segment and 5 subchannels to the other). Therefore, the eight columns in this Figure each represent one possible valid segment mapping, showing how the ratio of subchannels in each segment can be set from 6:24 at one extreme progressively through to 24:6 at the other.

If it is assumed that the first segment is for closed subscriber group access, then it is preferred if the mappings shown in the right-hand column are used, as these provide a greater number of subchannels (and hence a higher data bandwidth) to the closed subscriber group.

Allocating more subchannels to the "inner" segment (i.e. area 18) allows user devices close to the femtocell device 4, and primarily those inside the building in which the femtocell device 4 is located, access to higher bandwidth than user devices 16 further away from the femtocell device 4, but still inside the "outer" segment (i.e. area 20). Since only a proportion of the subchannels are transmitted at a higher power level, the degree to which the femtocell interferes with its neighbours is reduced, which is a particularly significant consideration for femtocell device 4 deployments.

An embodiment of the invention extends this concentric segmentation approach, and allows the femtocell device 4 to offer simultaneous open and closed subscriber access. The segmentation ability is used to restrict the capacity available for open device access while allowing devices in the closed subscriber group to use a greater proportion of the available bandwidth.

Under this scheme, the "inner" segment, which uses the majority of the subchannels, is only made available to user devices 16 in the closed subscriber group, and is transmitted at a relatively low power level to ensure that its coverage does not extend significantly outside of the building in which the femtocell device 4 is located. The "outer" segment, which uses fewer subchannels than the "inner" segment, is made available for public access and is transmitted at a relatively high power level.

The MAC scheduler 30 in the femtocell device 4 controls these physical layer segments to ensure that their open and closed nature is maintained, and specifically refuses access to user devices 16 not in the closed subscriber group in the "inner" segment.

Further, the MAC scheduler 30 can select the specific subchannels to be used for the open device segment so that interference with neighbouring or overlying macrocells is minimised. The MAC scheduler 30 measures the level at which the macrocell transmissions are received in the femtocell 20, and the subchannels used in the macrocell that have the lowest received signal strength (which are probably not in use in the vicinity of the femtocell device 4) will be the best choice for use in the "open" femtocell segment 20.

Figure 4:
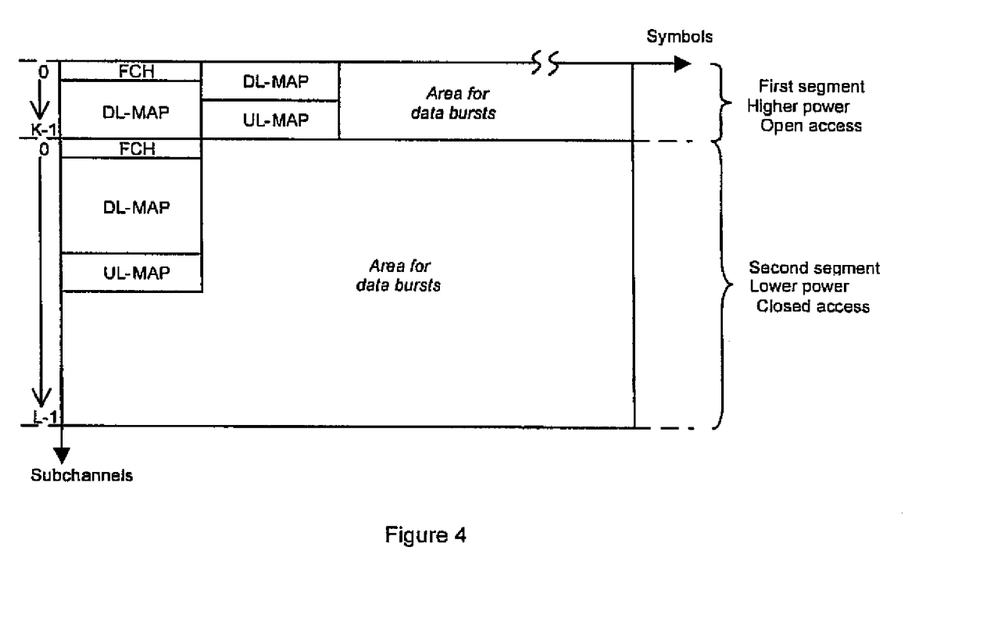
FIG. 4 shows an exemplary downlink frame structure in accordance with the invention.

FIG. 4 shows an exemplary downlink (i.e. from the femtocell device 4 to a user device 16) frame in accordance with the invention. Thus, the downlink frame can be partitioned between the two segments to provide open and closed access, there being 'K' subchannels in the second subset that are allocated to the "open" segment and 'L' subchannels in the first subset that are allocated to the "closed" segment. As described above, the subchannels in the first subset are transmitted at a relatively low power level, while the subchannels in the second subset are transmitted at a higher power level.

In this embodiment of the invention, each partition is transmitted with respective header information packets that effectively create two cells for the femtocell device 4. In a preferred embodiment of the invention, the header information packets include a respective Frame Control Header (FCH), downlink map (DL-MAP) and uplink map (UL-MAP) for each partition.

The Frame Control Header specifies how many subchannels are used by the femtocell device 4 and also describes how to decode the DL-MAP. The DL-MAP includes information about the size and location of all other bursts in the downlink, it indicates which user devices the bursts are destined for and specifies how to decode these bursts. The UL-MAP includes information about the size and location of all bursts in the uplink. It indicates which user devices should transmit in each burst, and specifies how the user devices should encode the burst data.

A consequence of this partitioned frame structure is that user devices 16 will view the segments as essentially distinct cells, with only those user devices 16 in the closed subscriber group being permitted access to the "inner" segment. As such user devices 16 move from inside the building to the outside (or more specifically out of coverage of the inner area 18), or vice versa, they will be required to perform a handover from one cell to the other to maintain the required quality of service. This handover would appear as a standard WiMAX handover to the user device 16, but it will be greatly simplified for the femtocell device 4 as the same MAC scheduler 30 is managing both femtocell segments. Thus, the procedure will be reduced to a simple physical (PHY) layer handover without the need for any inter-base station signalling over the network.

Thus in accordance with preferred embodiments of the invention, the femtocell device 4 creates concentric areas of coverage around a single omnidirectional antenna 26. A downlink frame can be split into two logical parts, with each part transmitted at a different average power level, such that the higher power part will cover the entire femtocell (area 20) while the lower power part will be constrained to an area with a smaller radius (area 18). Furthermore, in a femtocell device 4 deployment, the lower power inner segment will be primarily constrained (by radio propagation considerations) to lie within the external walls of the building in which the femtocell device 4 is located, while the higher power outer segment will extend outside of the building to cover the immediate vicinity. In addition, the two parts are allocated different numbers of subchannels such that the inner part has a higher bandwidth capacity than the outer part.

Figure 5:
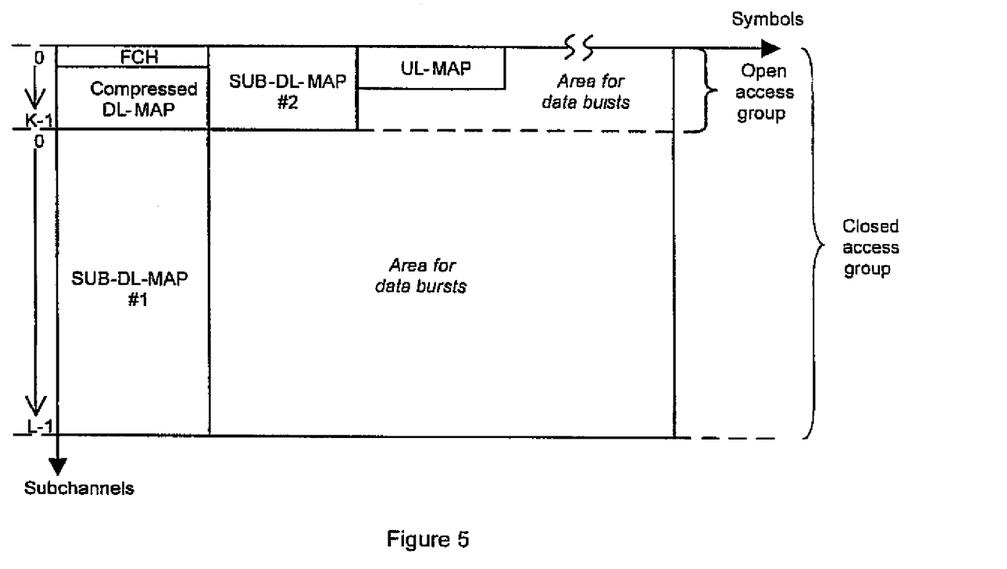
FIG. 5 shows an alternative downlink frame structure in accordance with the invention.

FIG. 5 shows an alternative downlink frame structure in accordance with the invention. Again, the downlink frame is partitioned to provide open and closed access, there being 'K' subchannels in the second subset that are allocated to the "open" segment and 'L' subchannels in the first subset that are allocated to the "closed" segment. Also as above, the subchannels in the first subset are transmitted at a relatively low power level, while the subchannels in the second subset are transmitted at a higher power level.

However, in this embodiment, there is no "segmentation", which means that the 'K' subchannels in the second subset include broadcast bursts for all user devices 16 that are in range of the femtocell device 4, not just user devices 16 that are not in the closed subscriber group. The 'L' subchannels in the first subset still only contain transmissions for user devices 16 in the closed subscriber group.

Usually the downlink frame starts with the FCH and DL-MAP broadcast bursts, with the DL-MAP describing the complete downlink frame structure (i.e. for all subchannels). However, an alternative method in WiMAX devices is to provide a compressed DL-MAP and SUB-DL-MAPs, with the location of the SUB-DL-MAPs being described by the compressed DL-MAP. Thus, bursts in the lower power part (the 'L' subchannels) are described by SUB-DL-MAP (#1), which is located in the lower power part of the frame, and bursts in the higher power part (the 'K' subchannels) are described by SUB-DL-MAP (#2), which is located in the higher power part of the frame.

With this downlink frame structure, all of the user devices 16 are registered in the same femtocell, and open access users are unaware that they are being restricted to a smaller number of subchannels. When a user device 16 registers with the femtocell device 4 it will typically be placed in the open subscriber group, since the higher power part has a larger radius. If the user device 16 moves towards the femtocell centre, and if it is permitted to join the closed subscriber group, the MAC scheduler 30 changes where in the downlink frame that user device's data bursts are placed. Specifically, the data bursts are moved from the higher power part to the lower power part. This removes the need to perform a handover between different cells. In addition, with a single "cell", the MAC scheduler 30 can locate bursts for user devices 16 in the closed subscriber group anywhere in the downlink frame (including in the 'K' subchannels). Therefore, the maximum throughput for the closed subscriber group is not reduced by additionally supporting devices that are not in the closed subscriber group.

Figure 6:
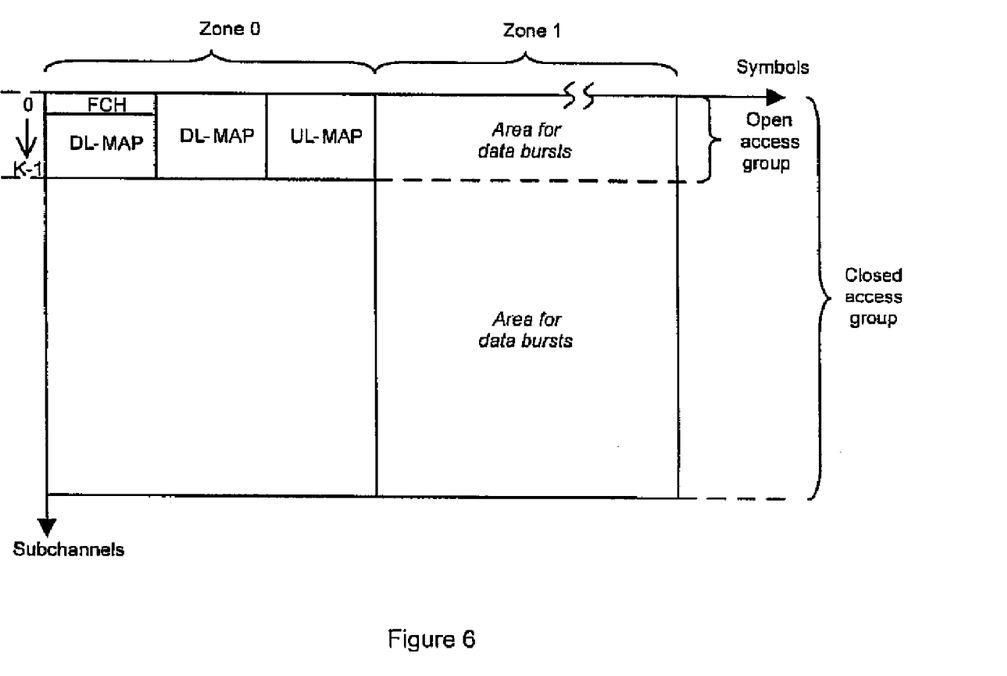
FIG. 6 shows a further downlink frame structure in accordance with the invention.

In a further alternative embodiment of the invention, the MAC scheduler 30 again creates concentric areas of coverage around a single omnidirectional antenna 26, but splits the downlink frame into two "zones". The first zone is a portion of the downlink frame on only the second subset of the available subchannels. The second zone uses all subchannels and is spilt into two parts, with each part transmitted at a different average power level, such that the higher power part will cover the entire cell, while the lower power part will be constrained to the smaller area 18. Furthermore, in a femtocell deployment, the lower power inner part will be primarily constrained (by radio propagation considerations) to lie within the external walls of the building in which the femtocell device 4 is located, while the higher power outer part will extend outside of the building to cover the immediate vicinity. Additionally, the two parts are allocated different numbers of subchannels, such that the inner part has a higher bandwidth capacity than the outer part.

FIG. 6 shows a downlink frame structure in accordance with this embodiment of the invention. The first zone in the downlink frame (Zone 0) is restricted to 'K' subchannels, and contains the broadcast bursts for all user devices 16, including the FCH, DL-MAP and UL-MAP. The DL-MAP indicates that the downlink frame includes a second zone (Zone 1) that uses all subchannels. The higher power part of the second zone (Zone 1) uses the same subset of the subchannels (i.e. 'K' subchannels) as the first zone (Zone 0) and contains bursts that are destined for user devices 16 that are not in the closed subscriber group. The lower power part of the second zone (Zone 1) uses the remaining subchannels (i.e. 'L' subchannels) and contains bursts that are destined for user devices 16 in the closed subscriber group.

With this method, all user devices 16 are registered in the same cell, and devices accessing the femtocell on an open basis are unaware that they are being restricted to a smaller number of subchannels. When a user device 16 registers with the femtocell device 4 it will typically be placed in the open subscriber group, since the higher power part has a larger cell radius. If the user device 16 moves towards to the cell centre, and is permitted to join the closed subscriber group, the MAC scheduler 30 will change the part of the downlink frame where data bursts destined for that user device 16 are placed. This removes the need to perform handover between cells. In addition, with a single cell, the MAC scheduler 30 can locate bursts for user devices 16 in the closed subscriber group anywhere in the frame. Therefore, the maximum throughput for the closed subscriber group is not reduced by additionally supporting an open subscriber group.

Figure 7:
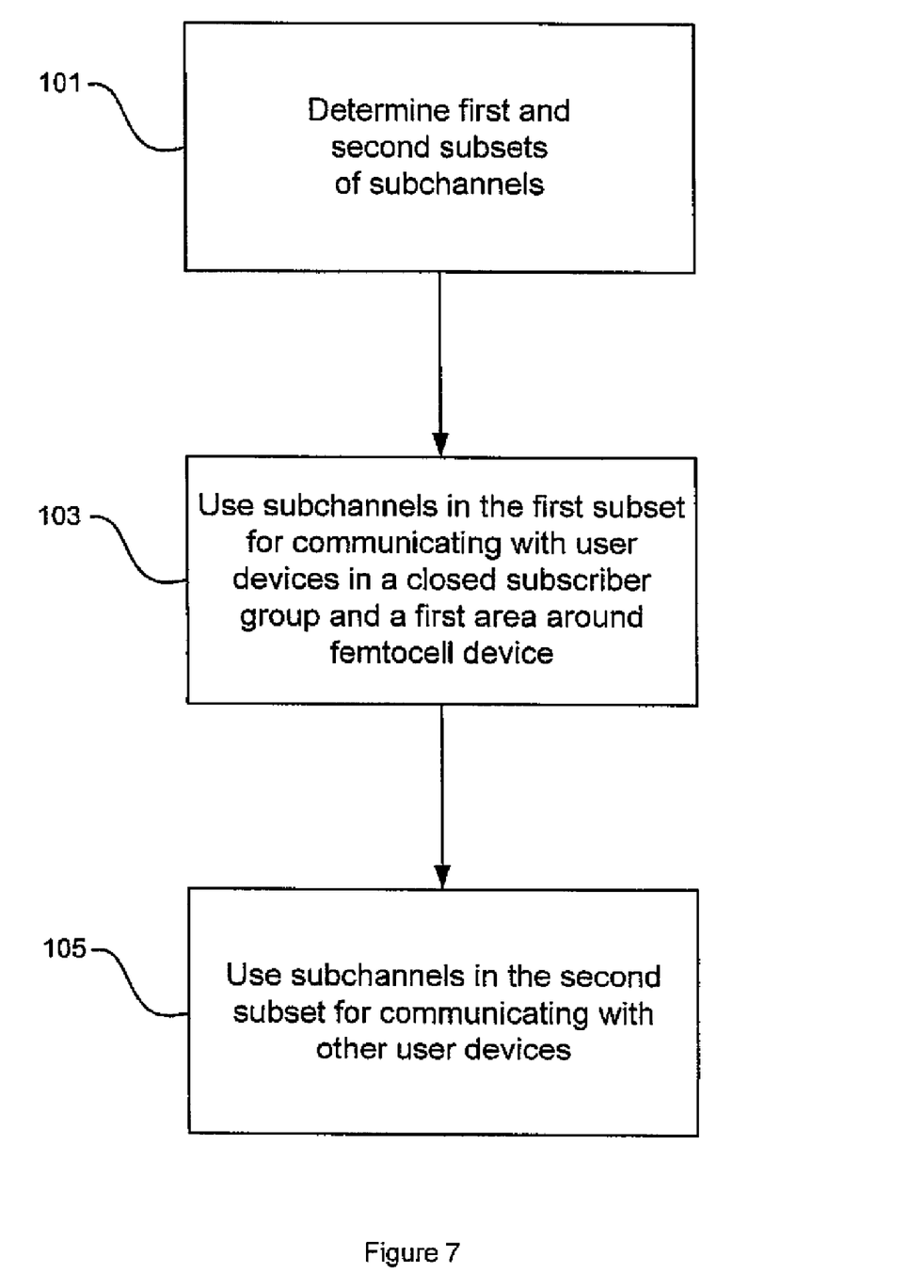
FIG. 7 shows a method in accordance with the invention.

FIG. 7 shows a method performed in a femtocell device 4 in accordance with the invention. In step 101, the femtocell device 4 divides the subchannels up into the first and second subsets. The femtocell device 4 then uses the subchannels in the first subset for communicating with user devices 16 that are in a closed subscriber group of the femtocell device 4 and that are in a first area 18 around the femtocell device 4 (step 103). Otherwise, the femtocell device 4 uses subchannels in the second subset for communicating with user devices (step 105).

Although the invention has been described in the form of a femtocell device, it will be appreciated that the invention can be embodied as a computer program or as suitably programmed hardware.

While the invention has been illustrated and described in detail in the drawings and foregoing description, such illustration and description are to be considered illustrative or exemplary and not restrictive; the invention is not limited to the disclosed embodiments.

Variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope. A computer program may be stored/distributed on a suitable medium, such as an optical storage medium or a solid-state medium supplied together with or as part of other hardware, but may also be distributed in other forms, such as via the Internet or other wired or wireless telecommunication systems.

The invention claimed is:

1. A femtocell device, comprising:
a transceiver configured to communicate with one or more user devices using a plurality of subchannels available for transmission over a network, wherein the femtocell device is configured to use a first subset of the plurality of subchannels to communicate with user devices that are in a closed subscriber group of the femtocell device and within a first area, and a second subset of the plurality of subchannels to communicate with other user devices.

2. A femtocell device as claimed in claim 1 further comprising a Medium Access Control Scheduler configured to allocate more of the plurality of subchannels to the first subset than the second subset.

3. A femtocell device as claimed in claim 1, wherein the femtocell device is configured to use the second subset of the plurality of subchannels to communicate with the other user devices within a second area.

4. A femtocell device as claimed in claim 3, wherein the femtocell device is configured to transmit signals on the plurality of subchannels in the first subset at a first average power level, and signals on the plurality of subchannels in the second subset at a second average power level.

5. A femtocell device as claimed in claim 4, wherein the second average power level is higher than the first average power level.

6. A femtocell device as claimed in claim 3, wherein the femtocell device is configured to create the first area around the femtocell device such that the first area is smaller than, but concentric with, the second area.

7. A femtocell device as claimed in claim 6, wherein the femtocell device is configured to use the second subset of the plurality of subchannels to communicate with user devices not in the closed subscriber group.

8. A femtocell device as claimed in claim 6, wherein the femtocell device is configured to use the second subset of the plurality of subchannels to communicate with user devices in the closed subscriber group but not in the first area.

9. A femtocell device as claimed in claim 1, wherein the transceiver is configured to transmit data to user devices in a plurality of downlink frames.

10. A femtocell device as claimed in claim 9, wherein the femtocell device is configured to partition each downlink frame in accordance with the first subset and the second subset of the plurality of subchannels.

11. A femtocell device as claimed in claim 10, wherein the transceiver is configured to transmit respective header information packets on subchannels in each partition.

12. A femtocell device as claimed in claim 11, wherein the header information packets comprise one or more of a Frame Control Header, a downlink map and an uplink map.

13. A femtocell device as claimed in claim 10, wherein the transceiver is configured to transmit common header information packets on one or more subchannels in the second subset.

14. A femtocell device as claimed in claim 13, wherein the femtocell device is configured to communicate with user devices that are in the closed subscriber group using the plurality of subchannels in both the first subset and the second subset.

15. A femtocell device as claimed in claim 13, wherein the common header information packets comprise one or more of a Frame Control Header, a compressed downlink map and an uplink map.

16. A femtocell device as claimed in claim 13, wherein the transceiver is configured to transmit respective partition-specific header information packets on subchannels in each partition.

17. A femtocell device as claimed in claim 16, wherein the partition-specific header information packets comprise a sub-downlink map.

18. A femtocell device as claimed in claim 1, wherein the first subset and the second subset comprise distinct subchannels.

19. A femtocell device as claimed in claim 1, wherein the femtocell device is for use in a WiMAX or 3GPP Long Term Evolution network.

20. A method of communicating with one or more user devices in a network, the network having a plurality of subchannels available for transmissions, the method comprising:
using a first subset of the plurality of subchannels to communicate with user devices that are in a closed subscriber group associated with a femtocell device and within a first area around the femtocell device; and
using a second subset of the plurality of subchannels to communicate with other user devices.

21. A system, comprising:
a network having a plurality of subchannels available for transmissions;
user devices; and
a femtocell device configured to communicate with one or more user devices in the network, wherein the femtocell device is configured to use a first subset of the plurality of subchannels to communicate with the user devices that are in a closed subscriber group of the femtocell device and within a first area, and a second subset of the plurality of subchannels to communicate with other user devices.

* * * * *